United States Patent [19]

Sekigawa et al.

[11] Patent Number: 4,509,201
[45] Date of Patent: Apr. 2, 1985

[54] WIRELESS TELEPHONE APPARATUS WITH PROTECTION AGAINST POWER LOSS

[75] Inventors: Tatsuaki Sekigawa; Akio Gotoh; Syuitsu Tsutsumi, all of Hachioji; Kuniyoshi Marui, Tokorozawa; Naoto Honda, Hino, all of Japan

[73] Assignee: Toshiba Corporation, Kawasaki, Japan

[21] Appl. No.: 506,906

[22] Filed: Jun. 23, 1983

[30] Foreign Application Priority Data

Jun. 23, 1982 [JP] Japan .................. 57-108070

[51] Int. Cl.³ .............. H04B 1/40; H04M 11/00
[52] U.S. Cl. .................. 455/73; 179/2 EA; 340/636
[58] Field of Search .......... 455/73, 76, 78, 79; 179/2 EA; 340/636, 663

[56] References Cited

U.S. PATENT DOCUMENTS

| 3,737,782 | 6/1973 | Pierce | 340/636 |
| 3,877,001 | 4/1975 | Bogut et al. | 455/73 |
| 4,052,717 | 10/1977 | Arnold et al. | 340/636 |
| 4,356,481 | 10/1982 | Kuki | 455/73 |

Primary Examiner—Jin F. Ng
Attorney, Agent, or Firm—Banner, Birch, McKie & Beckett

[57] ABSTRACT

Two limit voltages are established for a wireless telephone apparatus. If the power supply voltage exceeds the first limit voltage, the transmitter of the wireless telephone apparatus is prevented from radiating signals. At the same time, the central processing unit of the wireless telephone apparatus shelters, in a dedicated shelter register, the control data necessary to carry on communication once power is restored, and an inhibit circuit prevents the central processing unit from writing into the read-write memory. If the power supply voltage exceeds the second limit voltage, the central processing unit is disabled from exercising control of the apparatus. When the power supply voltage returns within the second limit voltage, the central processing unit is enabled to exercise control over the apparatus. When the power supply voltage returns within the first limit voltage, the transmitter is enabled to radiate signals and the central processing unit reestablishes communication using the sheltered data.

11 Claims, 10 Drawing Figures

FIG. 3
FREQUQENCY SYNTHESIZER

FIG.5
VOLTAGE MONITOR

FIG.7
RELAY CIRCUIT

FIG. 8 INHIBIT CIRCUIT

WIRELESS TELEPHONE APPARATUS WITH PROTECTION AGAINST POWER LOSS

BACKGROUND OF THE INVENTION

This invention relates to battery-powered wireless telephone equipment, such as is used in automobiles or any other wireless telephone equipment which may be subject to a drop in power supply voltage.

Figure 1:
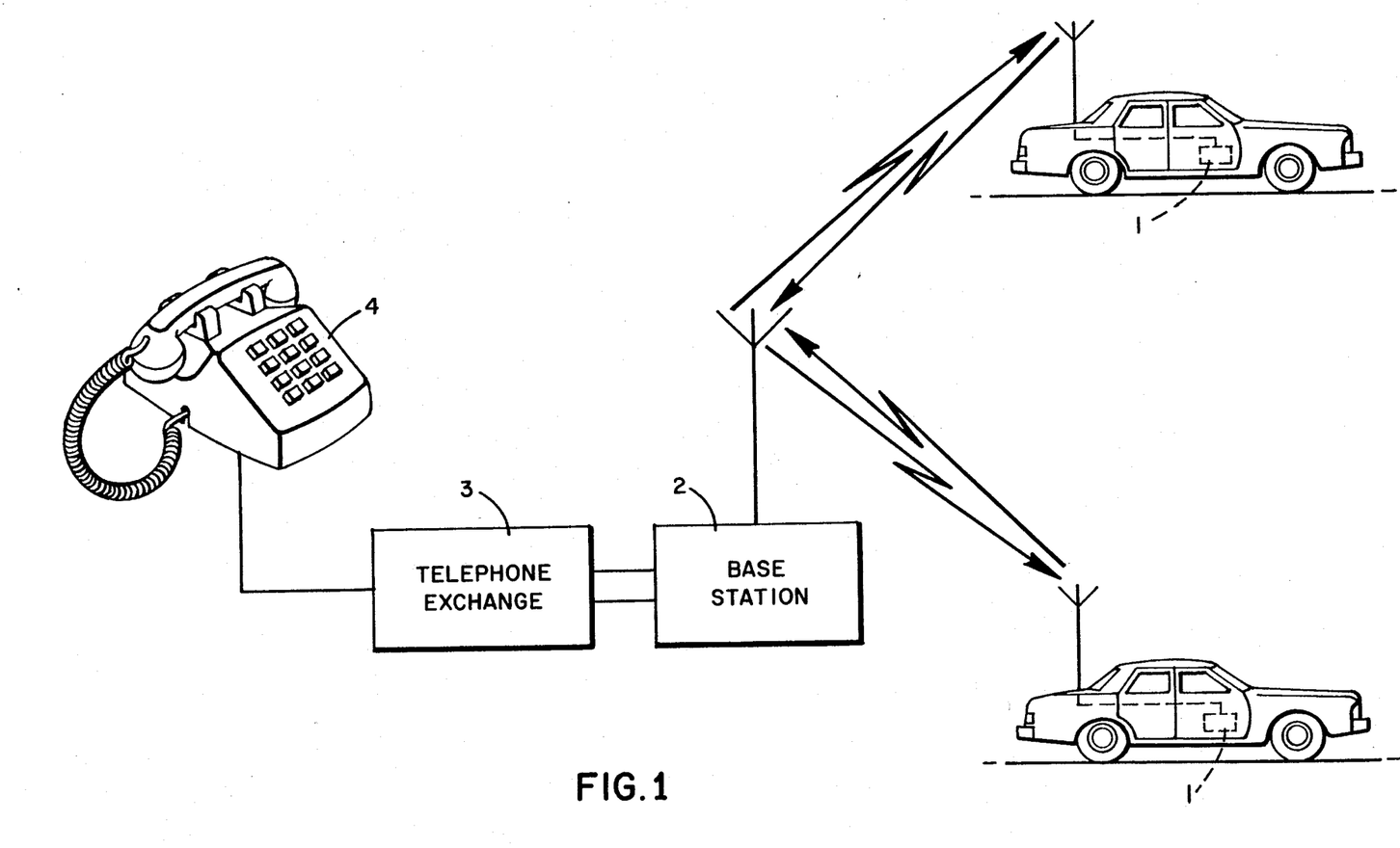
FIG. 1 is a block diagram of the major features of a wireless telephone system.

As shown in FIG. 1, a wireless telephone system includes wireless telephone apparatus 1,1 communicating by radio signals with base station 2 which is connected by landline to the telephone exchange 3. This arrangement enables calls to be placed between two wireless telephones 1,1 or a wireless telephone 1 and an ordinary telephone 4. The frequencies used in communicating between wireless telephones 1 and the base station 2 comprise a plurality of channels, at least one of which is allocated to control, the remainder being allocated to operations, that is, telephone conversations. A conversation on a vacant operating channel is first established by initiating communication on the control channel and exchanging control information, then switching to the operation channel.

Figure 2:
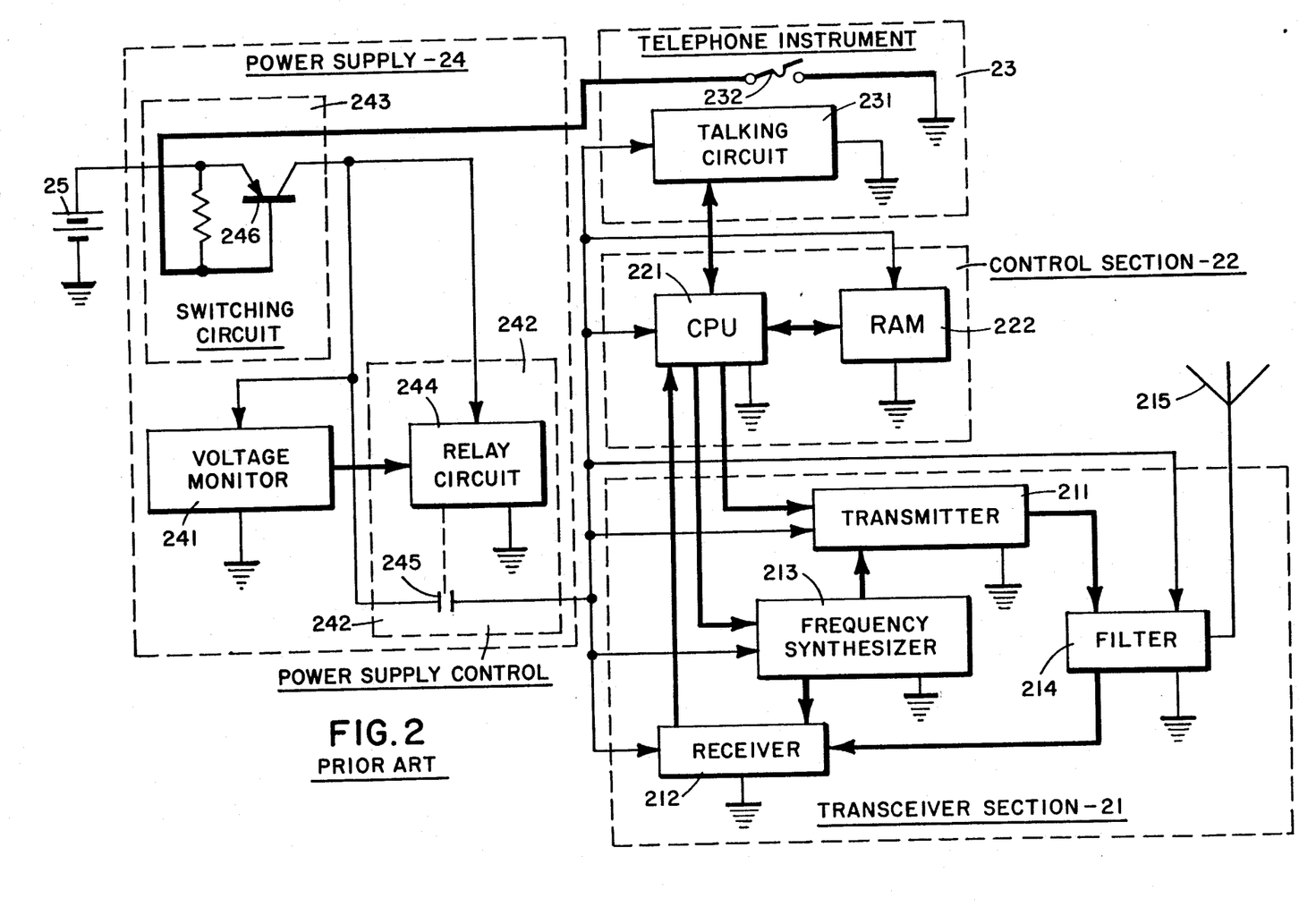
FIG. 2 is a detailed block diagram of a conventional wireless telephone apparatus.

FIG. 2 in a block diagram of conventional wireless telephone equipment 1. (In FIGS. 2, 4, 5, 7, 8 and 10, heavy lines indicate conductors which carry signals; while power-carrying conductors are drawn in medium weight lines.) This equipment may be divided into a transceiver section 21, a control section 22, a telephone instrument section 23, a power supply section 24, and a power source 25, such as the battery in an automobile. Forming a part of transceiver section 21 are transmitter 211, receiver 212, frequency synthesizer 213, filter 214, and antenna 215. Transmitter 211 accepts either the control signal from control section 22 or the audio signal from telephone instrument section 23 and uses the accepted signal to modulate the radio frequency which will be transmitted to base station 2. The modulated radio frequency from transmitter 211 is then passed to antenna 215, to be radiated, via filter 214. Receiver 212 intercepts an incoming modulated radio frequency signal via antenna 215 and filter 214 and demodulates it to either a control signal, which is sent to control section 22, or an audio signal, which is sent to telephone instrument section 23. Frequency synthesizer 213 serves as the local oscillator, supplying radio frequency signals to both transmitter 211 and receiver 212. Filter 214 actually comprises two band pass filters, one for the outgoing signal and one for the incoming signal.

Control section 22 comprises CPU (Central Processing Unit) 221 and a read-write memory, RAM (Random Access Memory) 222. CPU 221 controls the operation of both transceiver section 21 and telephone instrument section 23 in accordance with control data. RAM 222 records the control data required to establish and maintain the conversation, such as the location of the wireless telephone station.

Telephone instrument section 23 comprises a conventional talking circuit 231 to generate outgoing telephone calls and receive incoming telephone calls, and main power switch 232.

Before initiation of a call, CPU 221 sets the output frequencies of frequency synthesizer 213 to the frequencies corresponding to the control channel; location information transmitted by base station 2 is received by receiver 212 and stored in RAM 222.

If the operator of this wireless telephone station initiates a call, the call origination signal is transmitted by transmitter 211 to base station 2 and, according to the command transmitted from the base station, CPU 221 sets the output frequencies of synthesizer 213 to those corresponding to a vacant operating channel. Thereafter, talking circuit 231 is connected to transmitter 211 and receiver 212, and a conversation is established.

If this wireless telephone station is called by another, base station 2 transmits, over the control channel, the call receipt signal along with the appropriate frequency signal. Upon receipt of this information, CPU 221 sets the output frequencies of synthesizer 213 to correspond to the frequencies of the assigned operating channel. Talking circuit 231 is then connected to transmitter 211 and receiver 212 and the conversation is established.

Power supply section 24 comprises voltage monitor 241, power supply control 242, and switching circuit 243. Voltage monitor 241, which monitors the output voltage level of power source 25, normally outputs the active-high logic signal S to power supply control 242 when the monitored voltage exceeds the minimum level necessary to supply any of the sections of the wireless telephone apparatus. If the monitored voltage drop below this minimum level, volage monitor 241 outputs the active-low signal $\bar{S}$, that is, the alarm signal, and power supply control 242 disconnects power from all sections of the apparatus. In this way, erroneous operation of any section, due to the supply voltage being too low, is prevented. Power supply control 242 includes relay circuit 244 which operates relay 245, at which point power is interrupted. Switching circuit 243 comprises a switching transistor 246 which is turned on or off by main power switch 232.

In conventional wireless telephone apparatus, such as described above, the minimum voltage level which causes voltage monitor 241 to output an alarm signal is set at the lowest level which will guarantee normal operation of all sections of the apparatus. This results in the limit voltage being set rather high, for example, 10 volts in the case of equipment designed to operate from a 12.6 volt automobile battery. The reason for the narrow tolerance in supply voltage is the inability of frequency synthesizer 213 to properly operate over a large voltage range.

Figure 3:
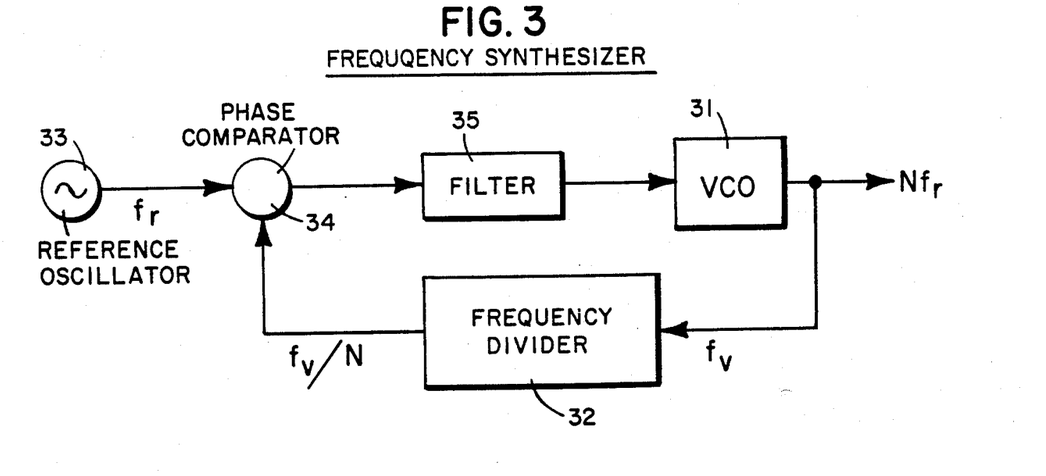
FIG. 3 is a block diagram of a frequency synthesizer which may be used either in conventional wireless telephone apparatus or with the present invention.

As shown in FIG. 3, frequency synthesizer 213 includes a phase-locked loop (PLL) in which the output frequency is determined by a voltage-controlled oscillator (VCO) 31. The frequency of the output signal $f_v$ of VCO 31 is divided, by a frequency divider 32, by a factor of N. The phase of this signal $f_v/N$ is then compared in phase comparator 34 with the phase of reference frequency $f_r$ of reference oscillator 33. The output voltage of phase comparator 34, which is proportional to the phase difference of its two input signals, is supplied to VCO 31 via filter 35. In this way, the output signal of VCO 31, which is also the output signal of synthesizer 213, is controlled to be $Nf_r$. By changing the value of N, the divisor of the frequency divider, frequency $f_v$ is changed. If, however, the voltage supplied to either VCO 31 or phase comparator 34 drops, its bias conditions are changed and the output frequency of the VCO will vary momentarily. In an extreme case, lockout of the PLL will occur, causing radiation of signals at an undesired frequency.

As is well known, the output voltage of an automobile battery may be temporarily reduced under certain conditions such as idling with a heavy electrical load or cold starting. (See Society of Automotive Engineers, Recommended Environmental Practices for Electronic Equipment Design (SAE J1211, S4.10.1.) In an automobile containing a wireless telephone, therefore, if a conversation is being maintained during engine starting, and if the start causes battery voltage to drop below the limit voltage, the power supply to all circuits (except RAM 222, which is supplied by a backup battery) will be interrupted, and all circuits will be reinitialized after the start, when battery voltage rises above the limit level. Unfortunately, the conversation is cut off, and reinitialization does not allow it to be resumed. In order to resume the conversation, another call must be originated. This is an undesirable feature of mobile telephone service.

Another undesirable effect of the termination of conversations due to power supply voltage drops is that origination of the call must be done, as it always is, on the single control channel. Consequently, the traffic level on the control channel is increased, and the operating channels are used inefficiently.

A further source of inconvenience due to a supply voltage drop relates to the storage of location information in RAM 222. In wireless telephone systems, a service zone is divided into a plurality of control zones, each with its own base station 2. The base station in each zone periodically transmits location information on a dedicated channel to all wireless telephone stations in the zone notifying the wireless stations that they are within a particular zone. This location information is written by each wireless telephone station into its RAM 222. Whenever the location information changes, for example, when the wireless telephone station moves into a different control zone, the wireless telephone station transmits its identification to the base station for that control zone, so that the base station is always kept informed of which wireless telephone stations are within its control zone. Transmission of this identification from wireless telephone stations 1 to the base stations 2 is done on the control channel.

Despite the existence of backup power to RAM 222, it is possible for an interruption in power to occur, when the voltage level of the wireless telephone's power source 25 drops below the limit level, during the switchover from main to backup power. During this power interruption, CPU 221 may run away and change or delete the control information stored in RAM 222. When power is restored, and location information is again written into RAM 222, it will appear as though the location information has changed, and the control channel will again be used to inform the base station of the presence of the wireless telephone station.

With increased use of the control channel, the probability increases that the channel will be busy and that a call cannot be completed. Service degradation is the result.

SUMMARY OF THE INVENTION

It is an object of the present invention to provide wireless telephone apparatus which can resume a conversation upon recovery from a temporary decrease in power supply voltage.

Another object of the invention is to provide such wireless telephone apparatus in which reorigination of a call is unnecessary for certain temporary reductions in power supply voltage.

It is a further object of the present invention to minimize traffic on the control channel of a wireless telephone system and increase the efficiency of use of operating channels.

A further object of the present invention is to improve wireless telephone service.

According to the present invention, and in order to realize the above objects, two power supply low voltage limits are established. (Two high voltage limits may instead be established.) One low limit voltage, $V_2$, is set at the minimum value which will guarantee satisfactory operation of the control section of the wireless telephone apparatus (including the CPU). The second low limit voltage, $V_1$, is higher than $V_2$ and is set to the minimum value which will assure satisfactory operation of the transceiver section of the apparatus, and especially the frequency synthesizer. Power supply output voltage is then monitored for both of these limits.[1]

[1] If the limits are high voltage limits, $V_2$ is set at the maximum value which will guarantee satisfactory operation of the control section, and $V_1$, which will be lower than $V_2$, is set at the maximum value for trasnsceiver operation.

If the output voltage of the power source decreases to $V_1$, power to the transceiver section of the wireless telephone apparatus is interrupted, preventing radiation of spurious signals. At the same time, control information necessary to resume the conversation is sheltered in a special shelter register in the control section of the apparatus. When the output voltage rises about $V_1$, the control section refers to the sheltered information and, instead of reinitializing the apparatus, resets it to the state which existed immediately before the voltage drop. The conversation which then existed may therefore be continued.

If, however, power supply voltage drops below $V_2$, the lower limit voltage, power is interrupted not only to the transceiver section but also to the control section. In this case, an inhibit circuit is activated preventing the CPU from writing in the RAM until the power supply voltage rises above $V_2$. The inhibit circuit, like the RAM, has a backup power supply.

DETAILED DESCRIPTION OF THE PREFERRED EMBODIMENT

Figure 4:
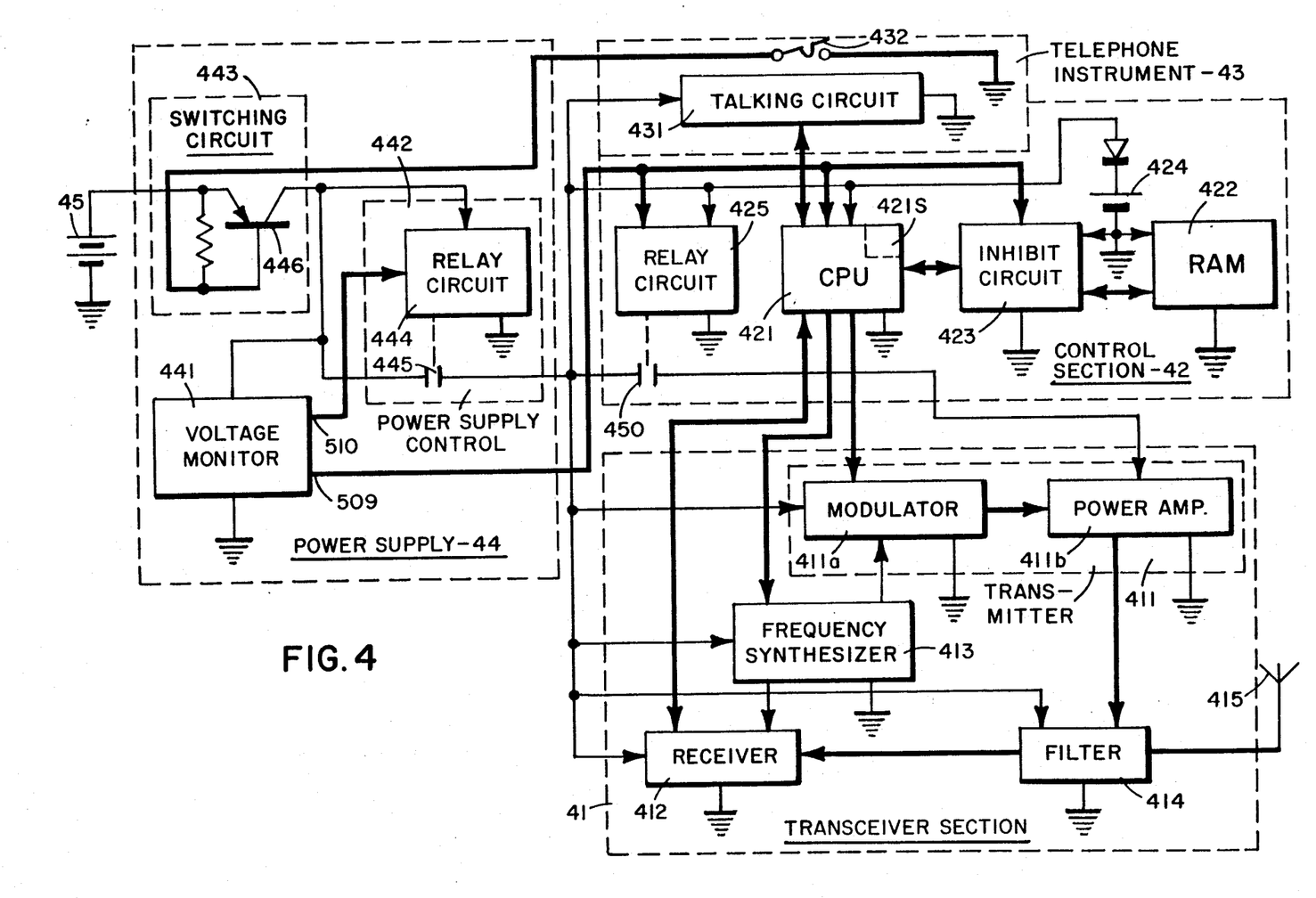
FIG. 4 is a detailed block diagram of wireless telephone equipment illustrating one embodiment of the present invention.

According to FIG. 4, the wireless telephone apparatus of the present invention comprises transceiver section 41, control section 42, telephone instrument section 43, power supply section 44, and power source 45 which may be, for example, an automobile storage battery.

Transceiver section 41 comprises transmitter 411, receiver 412, frequency synthesizer 413, filter 414, and antenna 415. Included in transmitter 411 are modulator 411a and power amplifier 411b.

Control section 42 comprises CPU 421, RAM 422, inhibit circuit 423, backup battery 424, and relay circuit 425. Included in CPU 421 is shelter register 421s.

Telephone instrument section 43 comprises conventional talking circuit 431 to generate outgoing telephone calls and to receive incoming telephone calls, and main power switch 432.

Operation of the apparatus will be described with respect to low limit voltages, viz, those which are below the normal power supply voltage. Under normal operating conditions, that is, when the power supply voltage is above the highest limit voltage, transceiver section 41, control section 42 and telephone instrument section 43 operate exactly like their counterparts in the prior art described above in connection with FIG. 2. This aspect of the operation of these circuits will therefore not be repeated.

Power supply section 44 comprises voltage monitor 441, power supply control 442, and switching circuit 443. Power supply control 442 includes relay circuit 444 and relay 445. Switching circuit 443 includes switching transistor 446.

Under normal operating conditions, relay 445 is held closed, allowing power to be delivered by power supply section 44 to transceiver section 41, control section 42, and telephone instrument section 43.

Voltage monitor 441 constantly monitors the output voltage of power source 45. During any period when the output voltage of source 45 drops below the first limit voltage $V_1$, voltage monitor 441 outputs the active-low first alarm signal $\overline{AL1}$ to control section 42 through output terminal 509. First limit voltage $V_1$ is set at the minimum value necessary to assure satisfactory operation of transceiver section 41, especially frequency synthesizer 413. Voltage monitor 441 outputs the active-low second alarm signal $\overline{AL2}$ to power supply control circuit 442 through output terminal 510 during any period when the output voltage of power source 45 drops below the second, or lower, limit voltage $V_2$. $V_2$ is the minimum voltage necessary to assure satisfactory operation of control section 42.

The sequence of operations during a temporary supply voltage reduction is as follows: When power source output voltage drops below $V_1$, first alarm signal $\overline{AL1}$, from output terminal 509 of voltage monitor 441 is supplied to control section 42. Upon receipt of this active-low logic signal, CPU 421 performs a data sheltering program. Information necessary to reestablish communication with the other wireless telephone station (such as operating channel number) is placed in shelter register 421s. At the same time, relay circuit 425 removes power from relay 450, allowing relay 450 to open and interrupting power to power amplifier 411b, thereby preventing transmission of any further radio signals. Also, inhibit circuit 423, upon receiving the $\overline{AL1}$ signal, prevents CPU 421 from writing in RAM 422. The information contained in RAM 422 is therefore protected, and it is unnecessary to either correct this information when communication is reestablished, or to use the control channel. Still referring to FIG. 4, when normal power to inhibit circuit 423 and RAM 422 is interrupted by the opening of relay 445, backup battery 424 continues to supply power to these two elements.

If the output voltage of power source 45 recovers to a point above $V_1$, voltage monitor 41 stops outputting alarm signal $\overline{AL1}$ by outputting the active-high logic signal AL1 to conrol section 42. CPU 421 then performs a recovery program, using information sheltered in register 421s to reestablish communication. Inhibit circuit 423 no longer prevents CPU 421 from writing in RAM 422, and the output frequencies of synthesizer 413 are set at the values which existed immediately before the power loss. Relay 450 is powered to the closed position by relay circuit 425; power is supplied to power amplifier 411b; and signals are again radiated from antenna 415. The conversation may therefore be resumed without reorigination of the call and without use of the control channel.

If, however, the output voltage of power source 45 drops still further, below second limit voltage $V_2$, voltage monitor 441 outputs second alarm signal $\overline{AL2}$ from its output terminal 510. This active-low logic signal is supplied to relay circuit 444, which allows relay 445 to open, causing power to be interrupted to transceiver section 41, control section 42, and telephone instrument section 43. Even though all normal operations of these sections cease at this time, the control information necessary to resume the conversation has already been sheltered, and inhibit circuit 423 and RAM 422 are still powered by backup battery 424; therefore, this almost-complete power loss poses no difficulty to the resumption of the telephone call when power is restored. Because there are two limit voltages, the CPU is given a period of time (from the time when supply voltage decreases to $V_1$ until the time when supply voltage further decreases to $V_2$) during which it can shelter the control information. This warning period is unavailable when there is only one limit voltage.

Upon recovery of the power supply voltage above second limit voltage $V_2$, voltage monitor 441 stops sending the second alarm signal $\overline{AL2}$ by sending instead the active-high logic signal AL2 to relay circuit 444. This powers relay 445 closed, causing power to be restored to transceiver section 41, control section 42, and telephone instrument section 43.

Figure 5:
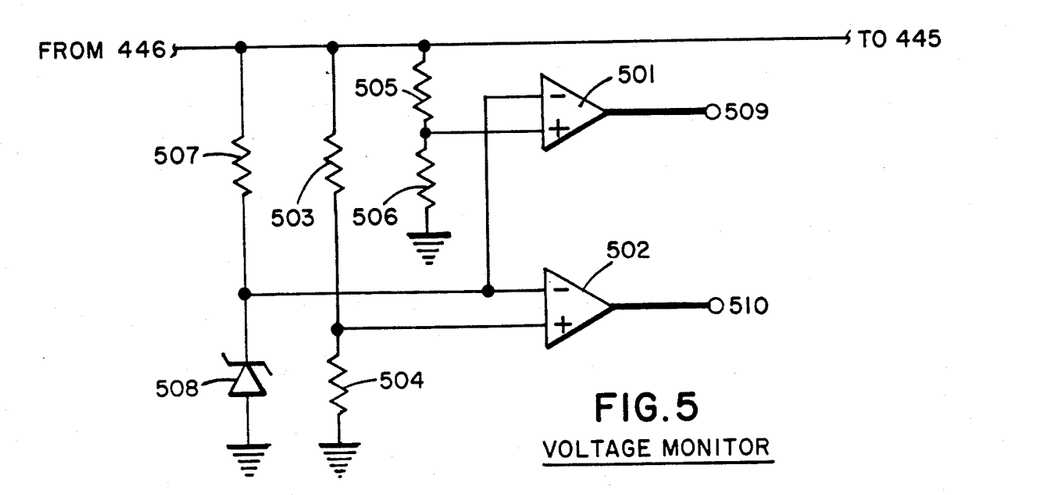
FIG. 5 is an electrical schematic diagram of a voltage monitor circuit for use with the present invention.

FIG. 5 illustrates one possible configuration of voltage monitor 441. Power from power source 45 is supplied through transistor 446 and monitored by two comparators 501 and 502. Line voltage is monitored at the positive input of comparator 501 by tapping a voltage divider composed of resistors 505 and 506. At the positive input of comparator 502, line voltage is monitored by tapping a voltage divider composed of resistors 503 and 504. For both comparators, a reference voltage is supplied at their negative inputs by a series combination of resistor 507 and Zener diode 508. The values of resistors 505 and 506 are selected so that when the voltage from transistor 446 drops to the upper limit voltage $V_1$, the voltage at the junction between resistors 505 and 506 is equal to the Zener diode voltage. The same method is used to select the values of resistors 503 and 504, recognizing that the voltage at their junction must be equal to the Zener voltage when the voltage being supplied from transistor 446 drops to the lower limit voltage $V_2$. First alarm signal $\overline{AL1}$ will be supplied from output terminal 509, while second alarm signal $\overline{AL2}$ will be supplied from output terminal 510. Comparators 501 and 502 output an active-high logic signal when the voltage at their positive terminals is greater than or equal to the voltage at their negative terminals, and an active-low signal otherwise.

Figure 6:
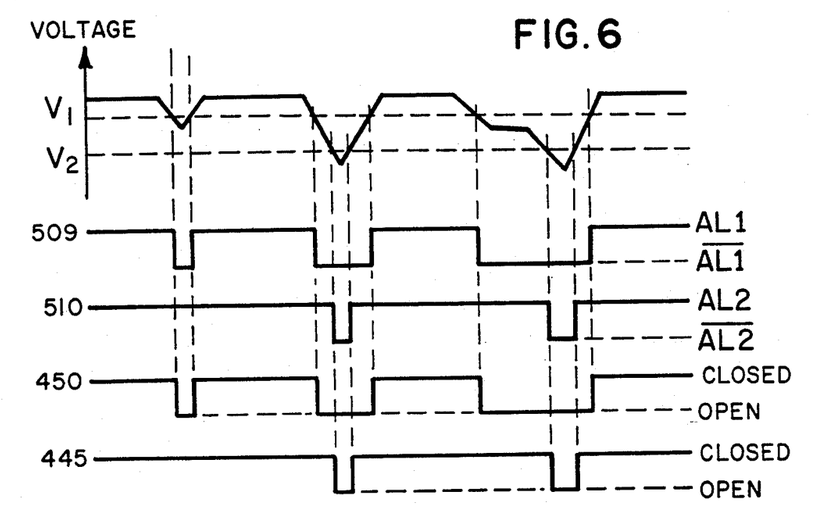
FIG. 6 is a timing chart illustrating the relationships among power supply voltage, output signals from the voltage monitor, and the states of relays.

FIG. 6 illustrates the relationships among power source output voltage $V_0$, the signals present at terminals 509 and 510, and the states of relays 445 and 450. For example, when $V_0$ drops below $V_1$, the first alarm signal $\overline{AL1}$ is present at output terminal 509, and relay 450 opens. When $V_0$ further drops below $V_2$, the second alarm signal $\overline{AL2}$ appears at output terminal 510 and relay 445 opens.

Figure 7:
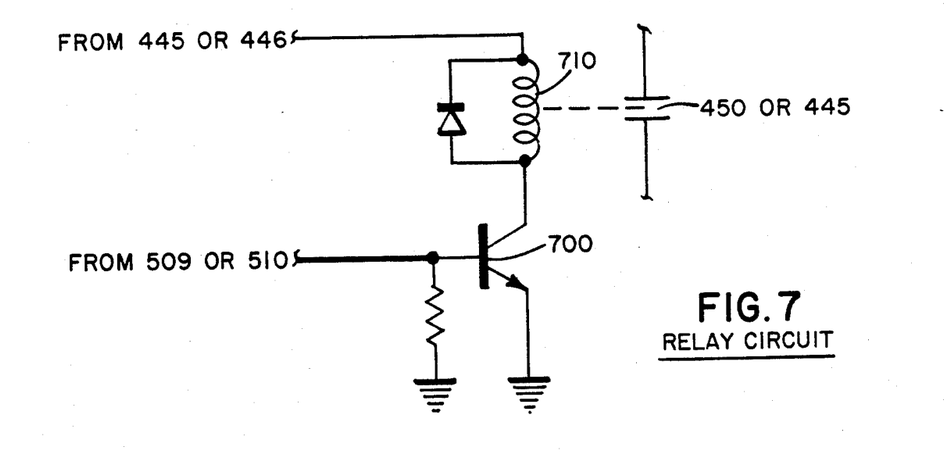
FIG. 7 is an electrical schematic diagram of a relay circuit which may be used with the present invention.

FIG. 7 shows one possible configuration of a relay circuit (425 or 444) for use with this invention.

Power is supplied, through relay driver transistor 700 to actuating coil 701 of the normally-open relay (either 450 or 445). The base of transistor 700 is connected to either output terminal 509 or 510 of voltage monitor 441. When the monitored voltage is sufficiently high, the active-high logic signal AL1 or AL2 is supplied to the base, saturating transistor 700 and keeping relay 450 or 445 closed. When the monitored voltage drops below the applicable limit voltage, the base of transistor 700 is supplied instead with the appropriate active-low logic signal, cutting off transistor 700 and allowing relay 450 or 445 to open.

Figure 8:
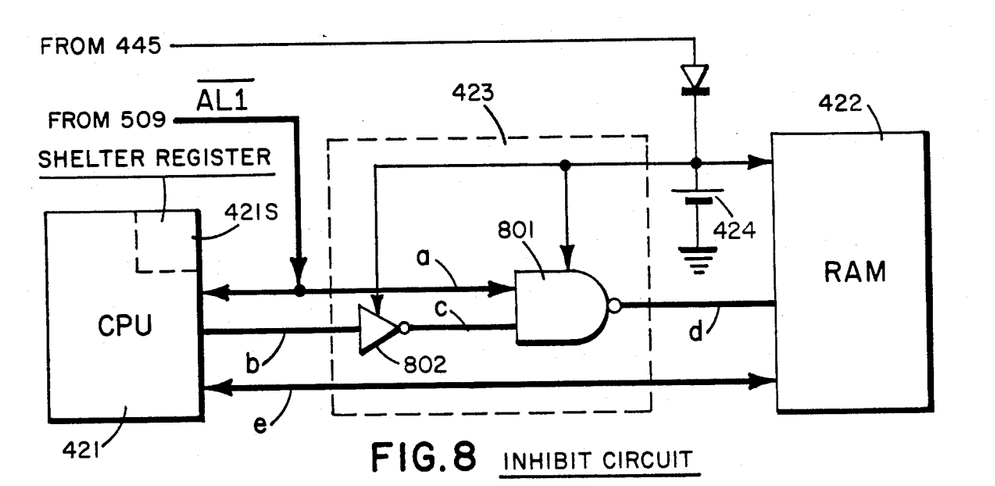
FIG. 8 is an electrical schematic diagram of an inhibit circuit of the present invention for use in illustrating its operation.
Figure 9:
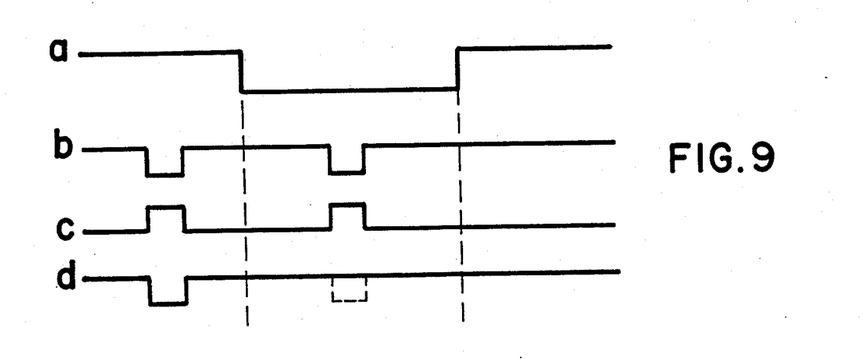
FIG. 9 is a timing chart of the signals in certain portions of the circuit of FIG. 8.

FIG. 8 illustrates one possible form of inhibit circuit 423 for use with this invention. The inhibit circuit comprises NAND gate 801 and inverter 802. Power is normally supplied to both of these elements, along with RAM 422, from relay 445, but, as mentioned above, it may instead be supplied by backup battery 424. This is done when relay 445 opens. Signal lines a, b, c, and d are control lines; whereas, signal line e is a data line used by CPU 421 to write in RAM 422. The signals present on lines a-d are shown in FIG. 9. Whenever the signal present on line d is at its high level, no writing can occur over line e into RAM 422. As long as active-high logic signal AL1 is being supplied from terminal 509, the signal on line d can be made to assume its low stage if CPU 421 outputs a low signal on line b, as shown in the left one-third of FIG. 9. Writing is then done while the signal on line d is in the low state. When the $\overline{AL1}$ signal is supplid from terminal 509, the signal on line d is maintained in its high position regardless of the level present on line b. Therefore, no writing into RAM 422 can occur. This is the situation in the center one-third of FIG. 9, where the dashed pulse for line d indicates the absence of a pulse which would normally occur without the alarm signal. It is preferred that inhibit circuit 423 be constructed of complementary metal-oxide-semiconductor (CMOS) circuits rather than single-polarity (such as NMOS) devices, because CMOS circuitry requires a lower supply voltage. If, then, CPU 421 uses only NMOS circuitry, it will be assured that inhibit circuit 423 continues to operate at any time CPU 421 is capable of altering or deleting the contents of RAM 422.

Although illustrative embodiments of the invention have been described in detail with reference to the accompanying drawings, it is to be understood that the invention is not limited to those precise embodiments and that various changes and modifications may be effected therein by one skilled in the art without departing from the scope or spirit of the invention. For example, the embodiment described above set limit voltages below the normal power supply voltage. However, limit voltages can also be set above the normal power supply voltage to guard against power surges. Because the frequency synthesizer would still be the element least tolerant of changes in power supply voltage, the first limit voltage, beyond which transmissions would cease, would be set lower than the second limit voltage.

Furthermore, in the above-described embodiments, in order to prevent radiation of spurious signals from antenna 415, power was interrupted to power amplifier 411b. Instead, it is possible to interrupt either radio frequency power to antenna 415 or DC power to the entire transceiver section. Disabling the power amplifier 411b, however, is preferable to either of these alternatives. Interruption of radio frequency power requires an expensive switch, and it is never possible to interrupt this signal completely. On the other hand, it is possible to completely shut down the power amplifier using a very inexpensive switch. If it were desired to deactivate the entire transceiver section, synthesizer 413 would also be deactivated, and additional time would be required once power is restored to lock on to the correct frequency.

Figure 10:
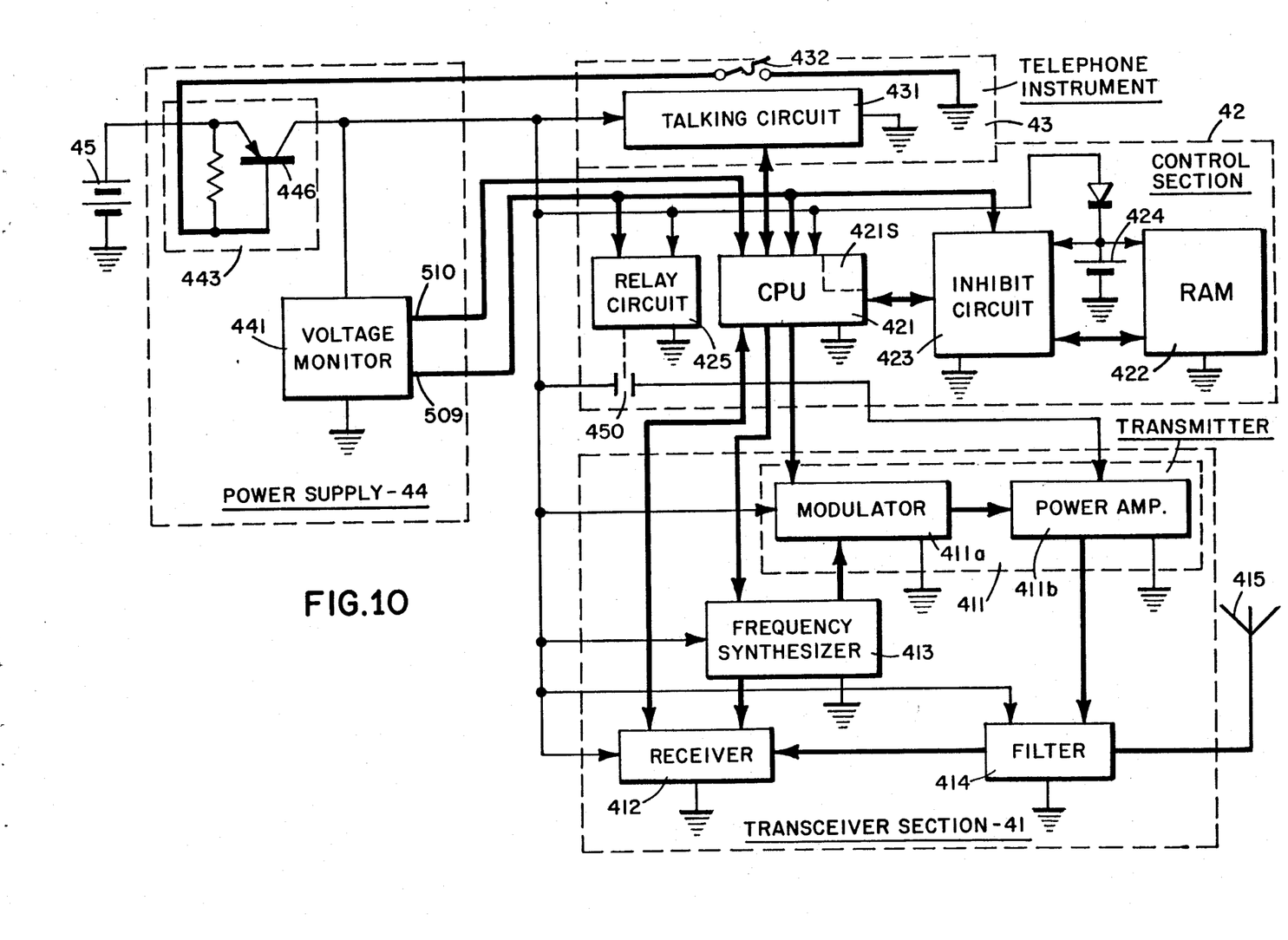
FIG. 10 is a detailed block diagram of wireless telephone equipment illustrating another embodiment of the present invention.

Another possible modification contemplated by the present invention is merely to disable CPU 421, rather than removing power from all sections of the wireless telephone apparatus, when power supply voltage decreases below the lower limit voltage $V_2$. This embodiment is illustrated in FIG. 10. In this case, power supply control 442 is omitted, and output terminal 510 is connected directly to CPU 421 so that the CPU receives both alarm signals $\overline{AL1}$ and $\overline{AL2}$.

Of course, while this invention has been described in connection with a power source 45 which is an automobile storage battery, any power source may be used. Temporary voltage reductions are possible with all power sources, because equipment may be connected in parallel with the wireless telephone apparatus.

We claim:
1. Wireless telephone apparatus for sending an outgoing telephone call and receiving an incoming telephone call, said wireless telephone apparatus comprising:
    talking circuit means for generating the outgoing telephone call and receiving the incoming telephone call;
    transmitter means for modulating a radio signal with the outgoing telephone call and for radiating the modulated radio signal;
    receiver means for intercepting a radio signal modulated with the incoming telephone call and for demodulating the intercepted radio signal;
    control means coupled to said talking circuit means, said transmitter means, and said receiver means for controlling, in accordance with control data, the operation of said wireless telephone apparatus;
    power supply means for furnishing electrical power at a power supply voltage to said talking circuit means, said transmitter means, said receiver means and said control means;
    monitor means coupled to said power supply means for generating a first alarm signal when the power supply voltage is beyond a first limit voltage and a second alarm signal when the power supply voltage is beyond a second limit voltage;

first interrupt means response to the first alarm signal for preventing said transmitter means from radiating the radio signal; and second interrupt means responsive to the second alarm signal for preventing said control means from controlling the operation of said wireless telephone apparatus.

2. The wireless telephone apparatus of claim 1 wherein said first and second limit voltages are more positive than said power supply voltage, said second limit voltage being more positive than said first limit voltage.

3. The wireless telephone apparatus of claim 1 wherein said first and second limit voltages are more negative than said power supply voltage, said second limit voltage being more negative than said first limit voltage.

4. The wireless telephone apparatus of claim 1 wherein said transmitter means comprises voltage sensitive frequency determining means for generating the radio signal.

5. The wireless telephone apparatus of claim 1 wherein said control means comrises a shelter register, said control means being responsive to the first alarm signal to store the data in said shelter register and responsive to absence of the first alarm signal to retrieve the data from said shelter register.

6. The wireless telephone apparatus of claim 1 wherein said first interrupt means is responsive to absence of the first alarm signal for enabling said transmitter means to radiate the radio signal and said second interrupt means is responsive to absence of the second alarm signal for enabling said control means to control the operation of said wireless telephone apparatus.

7. The wireless telephone apparatus of claim 1 wherein said control means comprises a central processing unit to control the operation of said wireless telephone apparatus, a read-write memory for storing the data written into said read-write memory by said central processing unit, and inhibit means connected between said central processing unit and said read-write memory, said inhibit means being responsive to the first alarm signal for preventing said central processing unit from writing into said memory and responsive to absence of the first alarm signal for enabling said central processing unit to write into said memory.

8. Wireless telephone apparatus for sending an outgoing telephone call and receiving an incoming telephone call, said wireless telephone apparatus comprising:

talking circuit means for generating the outgoing telephone call and receiving the incoming telephone call;

transmitter means for modulating a radio signal with the outgoing telephone call and for radiating the modulated radio signal;

receiver means for intercepting a radio signal modulated with the incoming telephone call and for demodulating the intercepted radio signal;

control means coupled to said talking circuit means, said transmitter means, and said receiver means for controlling, in accordance with control data, the operation of said wireless telephone apparatus;

power supply means for furnishing electrical power at a power supply voltage to said talking circuit means, said transmitter means, said receiver means and said control means;

monitor means coupled to said power supply means for detecting when the power supply voltage is beyond a first limit voltage and when the power supply voltage is beyond a second limit voltage;

transmission interrupt means coupled to said monitor means and said transmitter means for preventing said transmitter means from radiating the modulated radio signal when said monitor means detects that the power supply voltage is beyond the first limit voltage, said transmission interrupt means also enabling said transmitter means to radiate the modulated radio signal when said monitor means detects that the power supply voltage is not beyond the first limit voltage;

storage means within said control means for sheltering the control data when said monitor means detects that the power supply voltage is beyond the first limit voltage; and control interrupt means coupled to said monitor means and said control means for preventing said control means from controlling said wireless telephone apparatus when said monitor means detects that the power supply voltage is beyond the second limit voltage, said control interrupt means also enabling said control means to resume control of said wireless telephone apparatus when said monitor means detects that the power supply voltage is not beyond the second limit voltage.

9. The wireless telephone apparatus of claim 8 wherein said transmitter means includes a power amplifier connected to said power supply means to amplify the radio signal or the modulated radio signal, said transmission interrupt means preventing said transmitter means from radiating by disconnecting said power amplifier from said power supply means.

10. The wireless telephone apparatus of claim 9 wherein said monitor means generates a first alarm signal when the power supply voltage is beyond the first limit voltage and a second alarm signal when the power supply voltage is beyond the second limit voltage, said transmission interrupt means comprising a relay circuit responsive to the first alarm signal to disconnect said power amplifier from said power supply means.

11. The wireless telephone apparatus of claim 8 further comprising:

memory means coupled to said control means for storing control data written into said memory means by said control means; and inhibit means coupled to said control means and said monitor means for preventing said control means from writing into said memory means when said monitor means detects that the power supply voltage is beyond the first limit voltage, said inhibit means also enabling said control means to write into said memory means when said monitor means detects that the power supply voltage is not beyond the first limit voltage.

* * * * *